United States Patent [19]

Wortmann

[11] Patent Number: 4,637,121
[45] Date of Patent: Jan. 20, 1987

[54] METHOD OF OPERATING INDUSTRIAL ROBOTS, AND INDUSTRIAL ROBOT FOR CARRYING OUT THE METHOD

[75] Inventor: Johannes Wortmann, Georgsmarienhütte, Fed. Rep. of Germany

[73] Assignee: Wilhelm Karmann GmbH, Osnabruck, Fed. Rep. of Germany

[21] Appl. No.: 588,046

[22] Filed: Mar. 9, 1984

[30] Foreign Application Priority Data

Jan. 26, 1984 [EP] European Pat. Off. ........ 84100810.5

[51] Int. Cl.$^4$ .................................... B23Q 3/155
[52] U.S. Cl. .................................... 29/568; 29/26 A
[58] Field of Search .................. 29/568, 26 A; 414/744 A, 749

[56] References Cited

U.S. PATENT DOCUMENTS 4,310,958 1/1982 Balaud et al. ............... 29/26 A

Primary Examiner—Eugene F. Desmond
Attorney, Agent, or Firm—Felfe & Lynch

[57] ABSTRACT

A method of operating industrial robots supporting a tool on an arm thereof, wherein upon performing given works, the tool provided for such works is left connected to the associated supply lines, laid down, thereafter separated or detached from the robot arm, and another tool including the associated supply lines is connected to the robot arm and thereafter taken upon or raised, whereupon the operations for which the other tool is provided are carried out, and industrial robot for carrying out this method.

6 Claims, 4 Drawing Figures

METHOD OF OPERATING INDUSTRIAL ROBOTS, AND INDUSTRIAL ROBOT FOR CARRYING OUT THE METHOD

The present invention relates to a method of operating industrial robots supporting a tool on an arm, thereof, as well as an industrial robot for carrying out such method.

Industrial robots are in use in great numbers especially in production operations in the automobile industry, and they have proven their effectiveness. In automobile body production, such robots are used particularly for the spot welding of body components or of the body itself. To this end, the robot arm carries the spot welding electrode holder (tongs) which, under program control by a computer, approaches under various angles and welds the most varied positions of the automobile body.

However, a drawback of the conventional robots resides in the fact that these robots are equipped only with a given tool or a given spot welding electrode holder; therefore, the robots can perform only a limited number of operations or produce only such a number of welds as is determined by the geometry of the electrode holder.

It is accordingly necessary to use a great number of robots carrying various tools or spot welding electrode holders. Actually, this is not much disadvantageous when an assembly line or a similar production line is operated with only short station times, even though the number of the robots used is greatly increased thereby; in the production of small quantities and with long station times, however, the robots employed would be busy only for given periods, and therefore inefficient.

A further drawback is that a robot equipped with a given tool cannot, or not economically, be assigned for the production of most varied components (component variety) and in mixed operation.

In view of this, it is an object of the invention to provide an industrial robot and a method of operating same, which avoid the above-discussed drawbacks and which render possible to efficiently assign the robot not only for the production of small quantities (of parts), but to have it perform various operations, i.e. even in the case of component variety and in mixed operation.

Further, this object should lend itself to be solved not only economically or efficiently, but also reliably under the conditions of rough every-day operation, while maintaining the high production precision which is ascribed to the employment of robots.

Still further, the present invention is intended to enable for the first time the employment of robots in all such situations where such employment is otherwise not possible or economically reasonable in view of long station times or other factors, and the robot should in such use operate with a minimum of idle time, i.e. of such periods during which work is not actually performed, namely, for example, no spot weldings are made.

In addition, the solution according to the invention should be adapted to be realized in ready manner and with small investment.

According to the present invention, this object is solved in that upon performing given works, the tool provided for such works is left connected to the associated supply lines, laid down, thereafter separated or detached from the robot arm, and another tool including the associated supply lines is connected to the robot arm and thereafter taken upon or raised, whereupon the operations for which the other tool is provided are carried out tool on an arm thereof.

In order to improve operating safety, preferably the tool, after being laid down and prior to its separation from the robot arm, is fixed in its position, and such fixation is released when the tool is connected again to the robot arm for the next take-up.

In order to facilitate the connection between the robot arm and the tool, and to provide for precise positioning or alignment, preferably the robot arm is adjusted or aligned by the tool prior to establishing a tight connection to the laid-down tool during the final phase of approach (to the tool).

According to the invention, the industrial robot for carrying out this method includes one arm to which a tool may be releasably connected, and preferably the arm includes a connector plate provided with clamping jaws adapted to be radially contacted or engaged with clamping blocks of a connector plate of the tool.

For automatic adjustment in the final approach phase, advantageously the arrangement may be such that the connector plate of the tool on the one hand, and the connector plate of the arm on the other hand, are provided with a pair of guide holes and a pair of mating guide studs, respectively, with the studs in the approaching phase entering the holes to effect positive engagement final positioning.

Preferably, the clamping jaws are guided in splines and the clamping jaws are formed with an undercut in their radial outermost ends, which undercut has a curvature corresponding to the circumference of its clamping position, and the clamping blocks are formed with an undercut of such a shape that the ends of the clamping jaws are adapted to engage into the undercuts and spreading of the clamping jaws at the same time acts to press the connector plate against the connector plate.

For receiving the tool to be laid down or detached, according to the invention there is provided a magazine having a clamping device for the tool, wherein clamping jaws adapted to engage the connector plate of the tool are provided on opposite sides above the center thereof, which jaws are moved through a common leverage. According to another embodiment of the invention, the magazine may also include a bolt in its base, which bolt engages a groove formed in the periphery of the connector plate.

Preferably, the magazine may be positioned on a supporting frame above or adjacent to the work area of the robot arm as determined by the workpiece.

Evidently, the method or the robot according to the invention offer a plurality of advantages or benefits with low structural expenditure, so that it may be spoken of as an ideal solution to the existing problems. In these regards, it has to be noted particularly that the replacement of tools or the change from one spot welding electrode holder to another takes place in a minimum period of time and without any manual intervention (by operators).

Below, an exemplary embodiment of the invention is explained in greater detail by referring to drawings, wherein.

Figure 1:
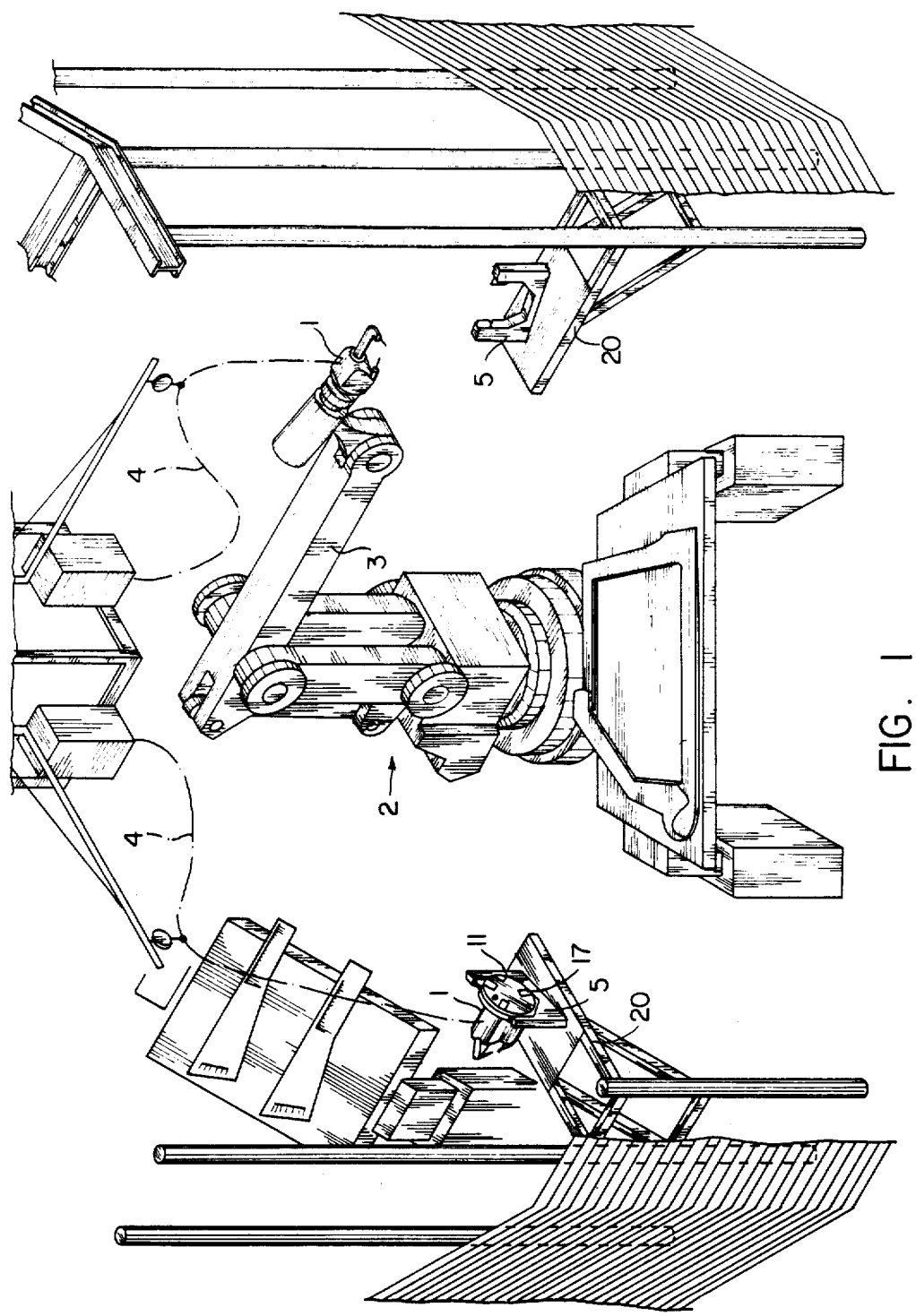
FIG. 1 shows an industrial robot provided with a welding electrode holder (tongs) and a magazine holding a further welding electrode holder and positioned adjacent to the work area of the robot arm.
Figure 2:
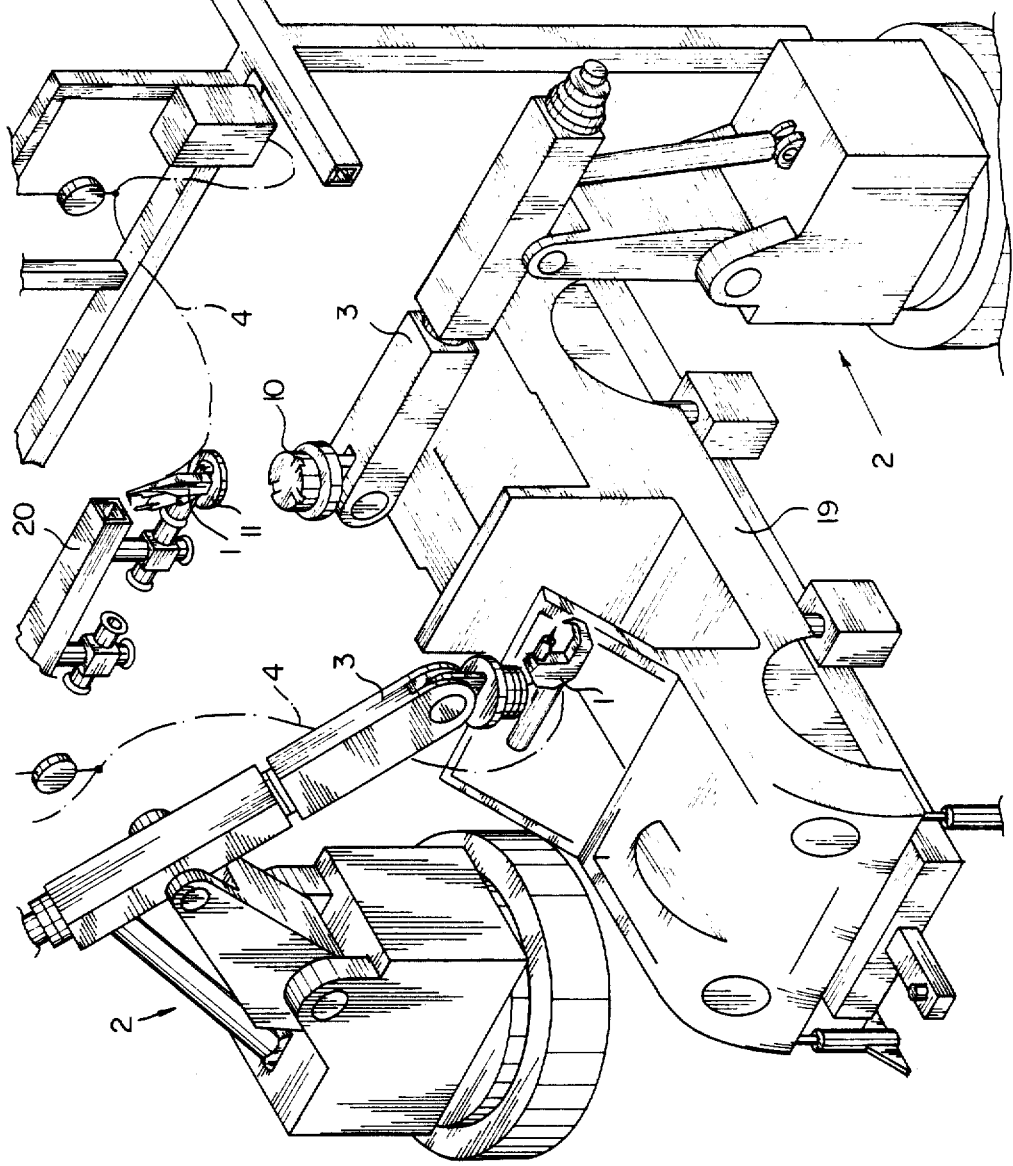
FIG. 2 shows an automobile body and a pair of robots welding the body, with overhead magazines.

As shown in FIGS. 1 and 2, the robot according to the invention is adapted either to work on one or more workpieces from a central position, or one or more robots perform the work from a side or lateral position. The robot, generally identified by numeral 2, comprises an arm 3 which holds the tool, i.e. a welding electrode holder (tongs) in the embodiment shown. The holder or tool 1 is supplied via supply (service) lines 4 with the necessary media, namely, for instance, electric power, water and compressed air.

It is essential to the invention that the supply (service) lines 4 remain connected to the tool 1 even when the latter is laid down or detached, such that only mechanical coupling need to be made for tool exchange.

An inoperative tool 1 is stored in a magazine 5 which is supported on a frame 20 or in an overhead position by a corresponding supporting structure.

The construction of the respective robots as well as the layout of the processing stations or the feeding of the workpieces or automobile bodies are well known to the one skilled in the art and therefore need not be explained in detail.

Figure 3:
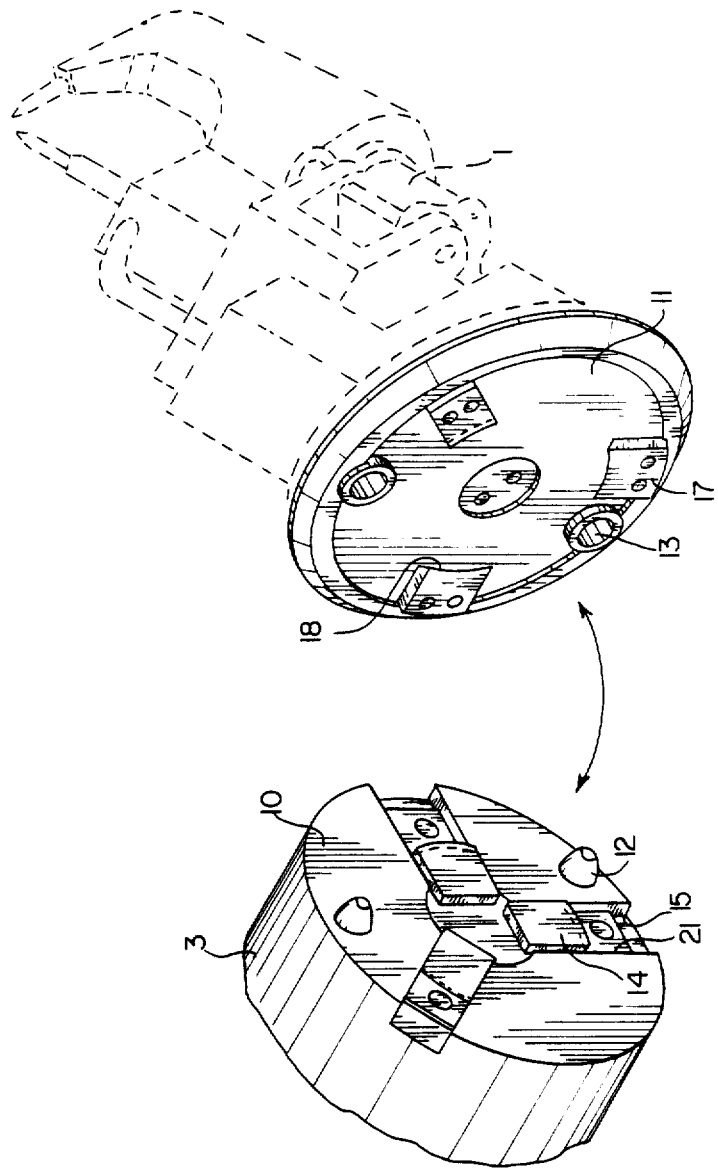
FIG. 3 is a perspective view of the connector plates of a robot arm and of a welding electrode holder.
Figure 4:
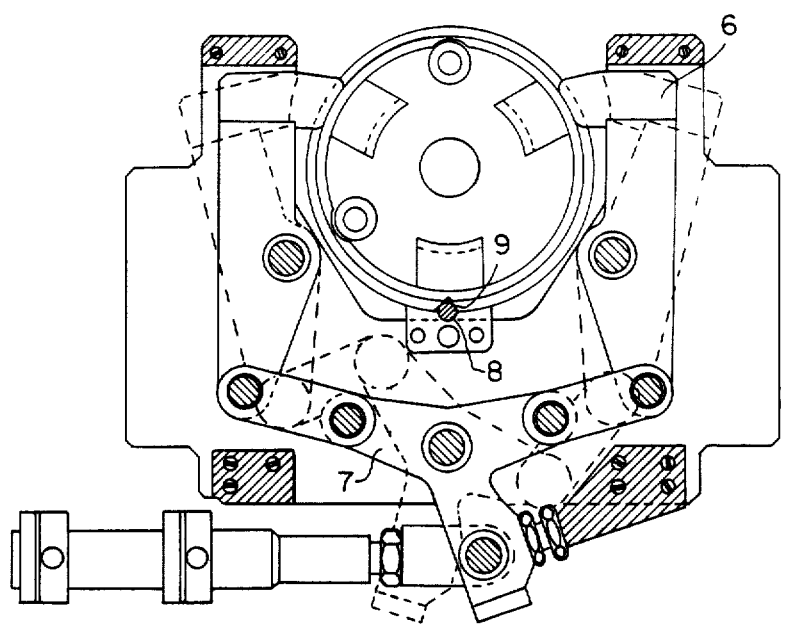
FIG. 4 illustrates a tool inserted into a magazine and locked within the latter, the open position of the locking means being illustrated in broken lines.

The coupling of the robot arm 3 to an electrode holder (or tongs), as an example of a tool, preferably is effected by means of a pair of connector plates 10 (mounted to the arm) and 11 (mounted to the holder). In this embodiment, the connector plate 10 includes a pair of lugs 12 which fit into holes 13 formed in the connector plate 11, when the connector plates are about to contact each other. As the lugs are rounded, and the hole 13 includes a corresponding liner, automatic alignment of the robot arm relative to the elctrode holder is ensured when the lugs enter the holes; in this way, not only minor variations are compensated for, but particularly an exact fit of the order of fractions of a millimeter is ensured. According to FIG. 3, two lugs and two holes are provided to this end, in order to obtain, on the one hand, also correct angular alignment, while, on the other hand, avoiding overdefinition or redundancy.

The connector plate 10 has formed therein splines (wedge-shaped grooves) 15 in which clamping jaws 14 are guided for radially outward movement. The outer ends of the clamping jaws 14 are provided with undercuts 21, with the outer edges and the undercut being curved with a shape to come to lie on the circumference of a circle in their clamping position.

The connector plate 11 of the tool 1, on the other hand, includes three clamping blocks 17 which, in turn, are provided with inwardly directed wedge-shaped undercuts 18. The curvature of the undercuts 18 corresponds to the curvature of the undercuts 21; upon engagement of the connector plates, the clamping jaws are extended to arrest the electrode holder 1 when the undercuts 18 and 21 come into contact with each other. In this way, the undercuts provide not only for a secure clamping action, but also for tight pressing of the connector plates 10 and 11 against each other.

The magazine 5 for receiving and storing the electrode holder 1 comprises a frame 22 to which the clamping jaws 6 and the leverage 7 for these jaws are mounted. The clamping jaws 6 engage the connector plate 11 laterally (from the sides) above the center of the connector plate, and a three-point locking action is thereby obtained upon actuation of the leverage 7 in combination with bearing means on the base. The bearing means on the base comprises a bolt 8 which enters a spline 9 formed in the periphery of the connector plate 11.

The industrial robot according to the invention operates as follows:

Upon performing given welding operations, the electrode holder (tongs) is laid down in a magazine positioned outside of the work area of the robot as defined by the workpiece, and the electrode holder is locked in this position by the clamping jaws 6. Then, the operating arm of the robot is released to allow it to pivot a new tool in the manner being normal also during the operation phases. Upon approaching the tool, the arm is connected to the tool, whereupon the magazine releases the locking action by actuation of the leverage 7. The tool is thereafter taken out of the magazine, and a new operation cycle starts.

I claim:

1. An industrial robot supporting a tool thereof, comprising:

an arm to which a first tool comprising a connector plate, having clamping blocks, may be releasbly connected, said arm including, upon performing given work, means for causing the robot to release the tool, the first tool being thereafter separated from the robot arm, while leaving the first tool provided for such work connected to one or more associated supply lines, and for connecting a second tool including one or more associated supply lines to the robot arm and thereafter causing the robot arm to move the second tool to a desired location, said means comprising a connector plate having clamping jaws adapted to be connected transversely of the connector plate with the clamping blocks, the connector plate of each tool on the one hand, and the connector plate of the arm on the other hand, comprising a pair of guide holes and a pair of mating guide studs, respectively, with the studs in an approaching phase entering the holes to effect positive-engagement final positioning, whereupon the operations for which the second tool is provided are carried out.

2. An industrial robot according to claim 1, in which the clamping jaws extend transversely of the connector plate of the robot arm and have an undercut in their outermost ends, which undercut has a curvature corresponding to the circumference of its clamping position, and the clamping blocks of the connector plate for the tool are formed with an undercut of such a shape that the ends of the clamping jaws are adapted to engage into the undercuts and spreading of the clamping jaws at the same time acts to press the connector plate of the robot arm against the connector plate for the tool engaged therewith.

3. An industrial robot according to claim 1, in which the robot includes a magazine for the tool to be released, which magazine includes a clamping device for the tool.

4. An industrial robot according to claim 3, in which the magazine is positioned adjacent the work area of the robot arm as determined by the workpiece.

5. An industrial robot according to claim 3, in which the magazine includes on both sides above the center of the connector plate of each tool, clamping jaws adapted to contact the connector plate of each tool and a common leverage adapted to move and lock the clamping jaws.

6. An industrial robot according to claim 5, in which the connector plate of each tool has a periphery and a groove formed in the periphery thereof and in which the magazine includes a bolt adapted to engage said groove.

* * * * *

UNITED STATES PATENT AND TRADEMARK OFFICE
CERTIFICATE OF CORRECTION

PATENT NO. : 4,637,121

DATED : January 20, 1987

INVENTOR(S) : Johannes Wortmann

It is certified that error appears in the above-identified patent and that said Letters Patent is hereby corrected as shown below:

Column 4, line 57:

for "for" read -- of --.

Signed and Sealed this

Fifth Day of July, 1988

Attest:

DONALD J. QUIGG

Attesting Officer      Commissioner of Patents and Trademarks